Nov. 19, 1963     F. C. CHAMBERS ETAL     3,111,175
HAND CULTIVATOR
Filed Aug. 26, 1960     2 Sheets-Sheet 2
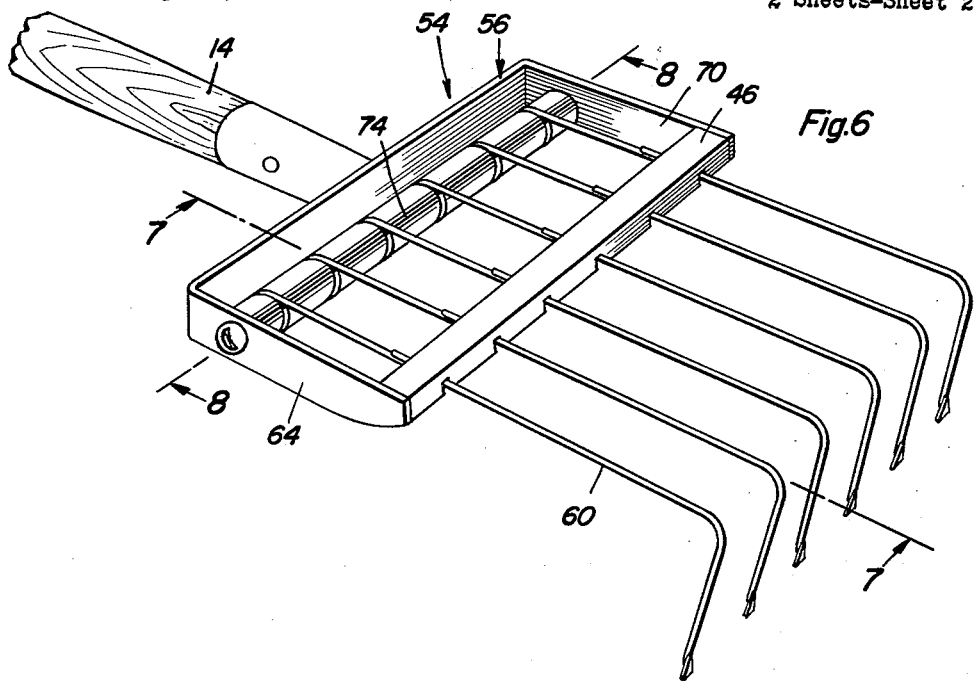
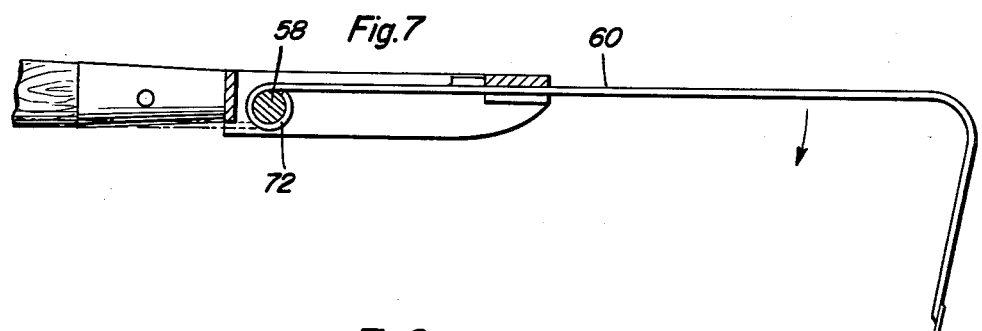
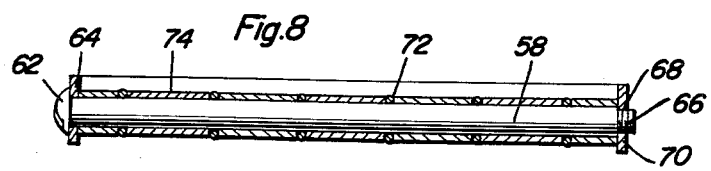
Frank C. Chambers
Herbert D. Mead
INVENTORS

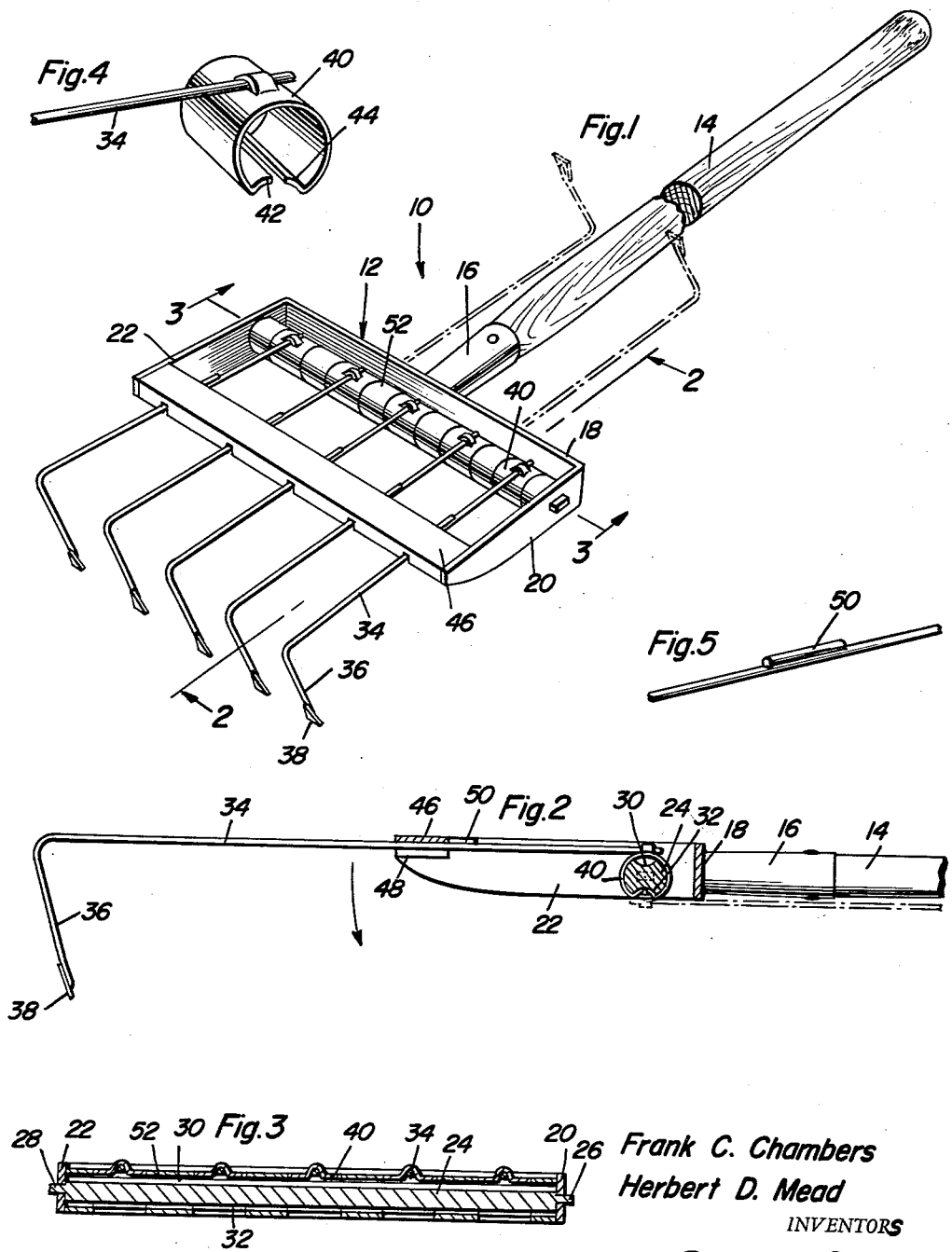

United States Patent Office 3,111,175
Patented Nov. 19, 1963

3,111,175
HAND CULTIVATOR
Frank C. Chambers, Denver, and Herbert D. Mead, Brighton, Colo.; said Mead assignor to said Chambers
Filed Aug. 26, 1960, Ser. No. 52,072
2 Claims. (Cl. 172—372)

This invention relates to a multipurpose implement which can be utilized as a cultivator, tamper and rake.

It is therefore a primary object of this invention to provide a tool capable of being converted as to the number of teeth prongs thereon in order to condition the tool for the plurality of uses referred to above.

A further object of this invention is to provide a cultivator implement which is simple in construction, assembly and easy to repair and yet is characterized by the requisite rigidity and strength necessary for accomplishing the plurality of uses for which the implement is designed.

An additional object of this invention is to provide a cultivator implement capable of being used for more delicate cultivation purposes and tamping purposes and also capable of being used for rougher raking requirements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one form of cultivator implement made in accordance with this invention.

FIGURE 2 is a sectional view taken through a plane indicated by section line 2—2 of FIGURE 1.

FIGURE 3 is a sectional view taken through a plane indicated by section line 3—3 of FIGURE 1.

FIGURE 4 is a perspective view of the tooth prong retaining clip.

FIGURE 5 is a perspective view of the stop mounted on the tooth prong.

FIGURE 6 is a perspective view of another form of cultivator implement made in accordance with this invention.

FIGURE 7 is a sectional view taken through a plane indicated by section line 7—7 of FIGURE 6.

FIGURE 8 is a sectional view taken through a plane of section line 8—8 in FIGURE 6.

FIGURE 9 is a side view of the mounted ends of a tooth prong of FIGURES 6 and 7.

Referring to the drawings in detail, FIGURE 1 illustrates the cultivator implement which is generally designated by reference numeral 10. The implement 10 includes a frame generally indicated by reference numeral 12 to which an elongated handle 14 is attached. The handle 14 is attached to the frame 12 by means of the tubular extension 16 connected to the transverse portion 18 of the frame 12. It will also be observed in FIGURE 1, that the frame 12 also includes side portions 20 and 22 integrally connected to the transverse portion 18 and disposed perpendicular thereto.

The side portions 20 and 22 of the frame 12 have connected therebetween a shaft member 24 as more clearly seen in FIGURES 2 and 3, said shaft member being disposed between the portions 20 and 22 of the frame 12 adjacent to the transverse portion 18. It will also be observed that the shaft member 24 includes end portions 26 and 28 which are rectangular in cross section and are fitted within alined openings within the side portions 20 and 22 of the frame in order to lock the shaft 24 thereto. It will also be observed that the shaft 24 includes longitudinal upper and lower recesses 30 and 32 placed 180 degrees from each other with respect to the axis of the shaft 24 for purposes as will hereafter become apparent.

The shaft 24 which is locked to the frame 12 as hereinbefore indicated is provided for the purpose of mounting a plurality of tooth prongs 34, each prong being identical in construction. Each of the tooth prongs 34 includes an outer tooth supporting portion 36 disposed at an acute angle to the shank of the prong 34 and has connected at the terminal end thereof a relatively small triangular shaped tooth 38. The other end of the shank of the tooth prong 34 is therefore mounted on the shaft 24. Referring therefore to FIGURE 4 in particular, it will be observed that each of the tooth prongs 34 has connected thereto a clip 40 which is approximately cylindrical in shape and as seen in FIGURE 2 the clip 40 embraces the shaft 24 and may be rotatable relative thereto in the direction of the arrow. The clip 40 however includes a pair of inwardly projecting portions 42 and 44 which cooperate with the recesses 32 and 30 in order to yieldably lock the clip 40 in one of two angular positions with respect to the mounting shaft 24. Accordingly as seen in FIGURE 2, the prong 34 is yieldably retained in the illustrated position inasmuch as the projections 42 and 44 of the clip 40 are disposed within the longitudinal lower recess 32 on the shaft 24. However, it will be apparent that the prong 34 may be rotated in a counterclockwise direction as indicated by arrow in FIGURE 2 to a position as shown by dotted line in FIGURE 2 as well as in FIGURE 1, in which latter case the clip 40 will have been rotated 180° so that the projections 42 and 44 will then be disposed within the upper longitudinal recess 30 of the shaft 24 to thereby yieldably lock the prong 34 in its inoperative dotted line position. It will therefore be appreciated that the implement may be used with either all of the available teeth or with only selected teeth thereof.

When the prongs 34 are in their operative position as illustrated in FIGURES 1 and 2 by solid lines it will be observed that the prongs are locked in their operative position relative to the frame 12 for the purpose of preventing undue bending of the tooth prongs and removal as well as breakage of the prongs when pressure is applied thereto by the user of the implement when engaging the earth with the teeth 38 on the prongs. Accordingly, a bar member 46 is connected to the outer or forward end of the side portions 20 and 22 of the frame 12, said bar 46 being disposed above the shank portion of the prongs 34. The bar 46 therefore also includes a plurality of spaced slots 48 within which each of the prongs 34 are received so as to prevent further upward pivotal movement of the prongs. It will also be observed in FIGURES 2 and 5 in particular, that a stop member 50 is attached in any suitable manner to the prongs 34 so that when the prong is in its operative position within the slot 48 of the bar 46, the stop member 50 will abut against the bar 46 so as to prevent removal of the prongs from the clip 40 to which it is attached. It will therefore be appreciated that the stop 50 on each of the prongs resists the tendency for the prongs to break away from the implement and thereby avoid applying stresses to the clip member 40 by means of which the prongs are pivotally mounted on the supporting shaft 24. It will also be appreciated that the bar 46 by engaging the prongs intermediate their ends as the prongs are received within the slots 48, the amount of bending of the prongs is thereby reduced. Also, the spacing of the slot 48 within the bar 46 maintain the prongs in spaced relation to each other.

It will however be observed in FIGURES 1 and 3 that additional spacers 52 are disposed loosely on the shaft 24 between the clips 40 so as to space the clips and the prongs 34 at their inner pivoting ends which also reduces the lateral bending of the prongs.

From the foregoing description, it will therefore be appreciated that a cultivating implement made in accordance with this invention is relatively rigid for the intended purposes and yet flexible to the extent needed. It will also be appreciated that the cultivator implement is especially useful for careful cultivation purposes such as cultivation about plants that are closely spaced relative to each other. In such a situation, all of the prongs 34 may be retracted except for one or two in order to more carefully cultivate the area about the plants without damage to the plants. Where a larger open space is to be cultivated, all of the teeth can be extended to their operative position for a less careful but more rapid cultivation operation. It will also be appreciated that the implement can be used as a tamping tool when planting new plants by using two adjacent tooth prongs to tamp about the new plant. A further advantage of the implement is the fact that the implement need not be discarded when a tooth prong thereof is broken inasmuch as the broken tooth prong may be easily replaced without even disassembling the implement.

In FIGURES 6, 7, 8 and 9 an alternative form of cultivating implement generally indicated by reference numeral 54 is illustrated. It will be observed that the implement 54 differs from the previously described form in that the frame 56 thereof mounts a different type of supporting shaft 58 while the tooth prongs 60 also differ from the tooth prongs 34 in the manner in which they are mounted on the supporting shaft.

It will therefore be observed that the supporting shaft 58 includes a screw head 62 at one end thereof as more clearly seen in FIGURE 8 which when assembled within the frame 56 abuts against the side portion 64 of the frame 56 while the other end of the shaft 58 includes a threaded portion 66 which is threadedly engaged within a threaded bore 68 in the side portion 70 of the frame 56. The shaft 58 is completely circular in cross-section as distinguished from the shaft 24 in the previously described form of the invention.

The tooth prongs 60 are therefore mounted on the shaft 58 in spaced relation to each other and are frictionally engaged therewith by means of a curved end portion 72 integral with the tooth prongs 60 as more clearly seen in FIGURE 9. The curved end portion 72 of the tooth prong 60 therefore embraces the shaft 58 to frictionally retain the prong in its operative or inoperative position. It will also be observed that the curved end portions 72 of each of the prongs 60 are maintained in spaced relation to each other on the shaft 58 by means of a plurality of spacer elements 74.

From the foregoing, the operation and utility of the described implements will be apparent. It should of course be appreciated that the extent to which the prongs extend beyond the cross member 46 of the implement depends upon the amount of flexing of the prongs that is desired. It will therefore be obvious that the length of the prongs used on any implement may be varied or staggered so that not only may the number of teeth be varied by selected retraction of prongs but also their length may be varied in order to use the implement for the many different purposes for which it is designed. It will therefore also be appreciated that the possession of an implement made in accordance with this invention will eliminate the necessity for having several implements. Also, the ease with which the implement may be repaired by removal of broken prongs without disassembly of the frame, would further add to the enhanced utility thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cultivating implement comprising, frame means, handle means connected to the frame means and extending rearwardly therefrom, supporting shaft means mounted in said frame means, a plurality of independently pivotally retractable tooth prongs rotatably mounted on said shaft means and extending forwardly beyond said frame means in operative positions and rearwardly on said frame means in inoperative positions, means for rotatably mounting each prong on said shaft means, means detachably connecting each prong to said rotatable mounting means for independent removal of each prong in said inoperative position, said prongs when in said operative positions being subjected to forces tending to produce angular and longitudinal displacement thereof respectively in one directional sense, and releasable lock means operatively connected to said frame means and each prong forwardly of the shaft means for operatively locking each tooth prong against said angular and longitudinal displacement when in said operative position, to permit retraction of each prong to said inoperative position.

2. A cultivating implement comprising, frame means, handle means connected to the frame means and extending rearwardly therefrom, supporting shaft means mounted in said frame means and having spaced recesses therein to define operative and inoperative positions, a plurality of independently pivotally retractible tooth prong means rotatably mounted on said shaft means and extending forwardly beyond said frame means in said operative positions and rearwardly beyond said frame means in said inoperative positions, said prong means being subject to forces tending to produce angular and longitudinal displacement thereof in one directional sense respectively relative to the frame means, and releasable lock means operatively connected to said frame means and each prong means forwardly of the shaft means for operatively locking each tooth prong means against said angular and longitudinal displacement when in said operative position, yieldable means connected to each tooth prong means for yieldably resisting pivotal movement of each prong means on the shaft means between the operative and inoperative positions, spacer means independent of the frame means and mounted on said shaft means for maintaining the prong means in spaced relation to each other, said lock means comprising a bar connected to the frame means having a plurality of spaced slots for receiving each prong means when in said operative position and stop means mounted on each prong means which abuts against the bar when the prong means is in said operative position to resist said longitudinal displacement of the prong means in said one directional sense, said yieldable means including a clip connected to each prong means pivotally embracing the shaft means, each clip having an inwardly extending projection which cooperates with said spaced recesses in the shaft means to angularly space and define the operative and inoperative positions of the prong means with respect to the shaft means.

References Cited in the file of this patent

UNITED STATES PATENTS

| | | |
|---|---|---|
| 1,072,657 | Schultz | Sept. 9, 1913 |
| 1,568,549 | Fey | Jan. 5, 1926 |
| 2,268,066 | Brooke | Dec. 30, 1941 |
| 2,787,491 | Roberts | Apr. 2, 1957 |

FOREIGN PATENTS

| | | |
|---|---|---|
| 141,591 | Australia | June 15, 1951 |
| 103,769 | Sweden | Feb. 17, 1942 |